(12) United States Patent
Higaki et al.

(10) Patent No.: US 7,340,100 B2
(45) Date of Patent: Mar. 4, 2008

(54) POSTURE RECOGNITION APPARATUS AND AUTONOMOUS ROBOT

(75) Inventors: Nobuo Higaki, Hiki-gun (JP); Yoshiaki Sakagami, Tokyo (JP); Naoaki Sumida, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 953 days.

(21) Appl. No.: 10/635,778

(22) Filed: Aug. 7, 2003

(65) Prior Publication Data

US 2004/0028260 A1 Feb. 12, 2004

(30) Foreign Application Priority Data

Aug. 9, 2002 (JP) ............................ P2002-234066

(51) Int. Cl.
*G06K 9/48* (2006.01)

(52) U.S. Cl. ...................................................... 382/199

(58) Field of Classification Search ...................... None
See application file for complete search history.

(56) References Cited

U.S. PATENT DOCUMENTS

| | | | | |
|---|---|---|---|---|
| 6,215,890 | B1 * | 4/2001 | Matsuo et al. | 382/103 |
| 6,256,400 | B1 * | 7/2001 | Takata et al. | 382/103 |
| 6,694,233 | B1 * | 2/2004 | Duff et al. | 701/23 |
| 2003/0059092 | A1 * | 3/2003 | Okubo et al. | 382/118 |

FOREIGN PATENT DOCUMENTS

| | | |
|---|---|---|
| JP | 7-282235 | 10/1995 |
| JP | 08-272974 | 10/1996 |
| JP | 8-315154 | 11/1996 |
| JP | 8-329254 | 12/1996 |
| JP | 11-174948 | 7/1999 |
| JP | 2000-099741 | 4/2000 |
| JP | 2000-326274 | 11/2000 |
| JP | 2001-92978 | 4/2001 |
| JP | 2002-92622 | 3/2002 |
| JP | 2003-039365 | 2/2003 |

* cited by examiner

*Primary Examiner*—Matthew C. Bella
*Assistant Examiner*—Alex Liew
(74) *Attorney, Agent, or Firm*—Squire, Sanders & Dempsey LLP

(57) ABSTRACT

A posture recognition apparatus recognizes instructions signified by postures of persons present in the surroundings, from images obtained with an image capture device. The posture recognition apparatus includes an outline extraction device that extracts an outline of a body which is a candidate for a person from the images; a distance calculation device that calculates a distance to the body being the candidate, from distance information of each pixel within the outline in the image; a search device that searches for a candidate for a hand of a person based on the outline and the distance to the body represented by the outline; and a posture determination device that determines an instruction corresponding to the relative position of the candidate for a hand and the outline, and outputs this determination result as a posture determination result.

16 Claims, 18 Drawing Sheets

FIG. 12

| POSTURE ID | AREA SECTION | POSTURE | PRIORITY SEQUENCE |
|---|---|---|---|
| 1 | A | SHAKE HANDS | 4 |
| 2 | B | SHAKE HANDS | 4 |
| 3 | C | ATTENTION | 3 |
| 4 | D | ATTENTION | 3 |
| 5 | E | STOP | 1 |
| 6 | F | STOP | 1 |
| 7 | G | MOVE RIGHT | 2 |
| 8 | H | MOVE LEFT | 2 |
| 9 | J | GOODBYE | 5 |
| 10 | K | GOODBYE | 5 |

POSTURE RECOGNITION APPARATUS AND AUTONOMOUS ROBOT

BACKGROUND OF THE INVENTION

1. Field of the Invention

The present invention relates to a posture recognition apparatus and an autonomous robot which recognizes instructions which a person issues, by capturing images and recognizing the posture of the person.

2. Background Art

Conventionally, autonomous robots that recognize instructions to themselves by means of voice recognition of vocal commands uttered by a person, and initiate movement, are known. These have the characteristic in the case of instructing the autonomous robot, of enabling the person instructing to give instructions without employing special apparatus.

However, the by-voice instruction system has the problem of requiring time for recognition because the voice recognition rate decreases in places where there is a lot of noise. Furthermore, with the voice recognition system, in order to increase the rate of recognition it is necessary to pre-register the voice of the person who utters the voice command and so the construction of the system becomes complicated.

In order to solve this kind of problem, an instruction recognition method employing image information is being tested. For example, the Gesture Recognition System described in Japanese Unexamined Patent Application First Publication No. Hei 8-315154 (hereafter referred to as prior art 1) is known. This system detects the hand of the person issuing the instruction by first employing the obtained image captured by a single camera and a hand template, and then carrying out the process of obtaining a normalized correlation with the angle of directionality of the localized image. The movement of the detected hand is then tracked in directions X and Y (relative position directions), a gesture signal corresponding to the position in space generated, and the machine is then controlled based on this gesture signal.

Also, the autonomous robot described in the Japanese Unexamined Patent Application First Publication No. 2000-326274 (hereafter referred to as prior art 2) is known. This autonomous robot detects persons from an image obtained with a stereo camera and controls its own movements corresponding to the various inputs of; detection of the direction of the sound source, voice recognition, touch sensor, ultrasonic sensor, of the movement of this detected person.

If these techniques are employed, they can be used as a human-robot interface in which the robot initiates its next movement by recognizing persons in the surroundings and recognizing the instructions issued by these persons.

However, in the method of carrying out detection of the hand, based on correlation with templates as in prior art 1, a plurality of templates are pre-stored internally for each hand size or shape, and detection of the hand is carried out by matching an image of a captured hand with a template. Therefore, along with having to store internally an enormous data volume of templates, and because of the enormous amount of calculation time that the matching process would necessitate, conditions are not suitable for carrying out real-time processing. With the method employing templates, because the setting of templates that can correspond to arbitrary image input is not easy, the operation mode is limited such as with the operation of a television set or the like. Furthermore, because the autonomous robot moves around freely, and because the background of the obtained image and the distance to the person giving the instructions cannot be fixed, posture recognition processing by means of template matching cannot be applied.

In the method as in prior art 2 in which a particular person is detected and identified, the object is to recognize an isolated person within a predetermined target measurement area. Therefore, in the case in which a plurality of persons are present within the obtained image, self action cannot be decided.

An object of the present invention is to provide a posture recognition apparatus which, even when installed on a moving body which can move freely, can carry out highly reliable posture recognition at high speed, and an autonomous robot that initiates movement based on the posture recognition result.

BRIEF SUMMARY OF THE INVENTION

A first aspect of the present invention is a posture recognition apparatus that recognizes instructions signified by postures of persons present in the surroundings, from images obtained with an image capture device. This posture recognition apparatus includes an outline extraction device that extracts an outline of a body which is a candidate for a person from the images; a distance calculation device that calculates a distance to the body being the candidate, from distance information of each pixel within the outline in the image; a search device that searches for a candidate for a hand of a person based on the outline and the distance to the body represented by the outline; and a posture determination device that determines an instruction corresponding to the relative position of the candidate for a hand and the outline, and outputs this determination result as a posture determination result.

According to this configuration, outline extraction is applied to the extraction of a person who is the target in performing posture recognition, and the distance image is referenced at the same time. Therefore, even in the case where a plurality of persons are present in the imaging area, posture recognition can be carried out with certainty. Moreover, the characteristic features such as the face and the hands of a person can be detected from the extracted outline information, and the posture of the person can be recognized from the relative positions of these characteristic features. Therefore, posture recognition that is highly reliable and able to be processed at high speed can be realized.

The posture recognition apparatus may further include a setting file in which an instruction is defined for each relative position of a hand to a body or a face of a person, and the posture determination device may obtain a posture determination result by referring to the instructions defined in the setting file.

According to this configuration, because arbitrary instructions can be set in the setting file, according to necessity, the changing of instructions for each of the relative positions of the hand and body and the face of the person is easy.

A priority level may be defined for each instruction in the setting file. According to this configuration, because a priority level is defined for each instruction, the determination of the instruction to be followed can be executed with certainty.

The posture recognition apparatus may further include a color area extraction device which extracts color information from the image and extracts areas having a predetermined color, and the search device may make an area inside the outline having a predetermined color a candidate for a hand of a person.

According to this configuration, because a particular color area is extracted and this particular color area is made a candidate for a hand, posture recognition can be executed with certainty.

The posture recognition apparatus may further include a device which, in the case where a plurality of persons are present in the surroundings, recognizes from the image the posture of each person based on the output of the outline extraction device. According to this configuration, recognition of posture can be performed even if there is a plurality of persons in the surroundings.

In the case where a plurality of persons are present in the surroundings, the instruction of the person closest to the center of the image may be prioritized. In this case, even if a plurality of persons are present in the surroundings, the determination of the instruction to be followed can be executed with certainty.

In the case where the instruction issued by a person not closest to the center of the image is a predetermined instruction, the instruction of the person who issues this predetermined instruction may be prioritized based on at least the priority level defined for the setting file. According to this configuration, because the instruction of a person who issues a predetermined instruction is given priority, instructions which avert risk can be made to be followed preferentially.

The posture recognition apparatus may further include a face recognition device that recognizes faces from amongst a plurality of persons, and the instruction of a particular person may be prioritized, based on this face recognition result. According to this configuration, because an instruction issued by a person whose face has been recognized based on the face recognition result is given priority, the instructions of a particular person can be made to be followed.

The posture recognition apparatus may further include a vertex point extraction device that extracts a vertex point from the outline, and a device that determines the position of a face and hand based on the vertex point. According to this configuration, because it includes a vertex point extraction device that extracts the vertex point from the outline, and a device that determines the positions of the face and hand based on the vertex point, extraction of the positions of the face and hand can be done easily.

A second aspect of the present invention is an autonomous robot including the above posture recognition apparatus. This autonomous robot includes a recognition result obtaining device that obtains a posture recognition result from the posture recognition apparatus; a movement instruction device that outputs movement instructions for performing self movement control in order that movements corresponding to the posture recognition result are initiated, and a movement control device that performs self movement control based on the movement instructions.

According to this configuration, in the case where the instruction is issued by posture from a person, the processing for initiating the action corresponding to this instruction is executed. Therefore, it becomes possible to control the operations of the autonomous robot without using an external controller or the like.

The autonomous robot may further include an image capture instruction device that outputs image capture instructions for performing self control of directing its own image capture device toward a person so that movements corresponding to the posture recognition result can be initiated, and the movement control device performs self movement control based on the image capture instructions.

According to this configuration, because is comprises an image capture instruction device that outputs image capture instructions for performing the control of directing its own image capture device toward a person, it becomes possible to initiate actions such as to follow a person who issued an instruction.

When steadily maintaining a distance to a person while moving, the movement control device may control movement so as to move while maintaining a first predetermined distance. According to this configuration, the distance to a person becoming too close and recognition becoming difficult, and the execution of predetermined operations becoming difficult can be avoided.

The movement control device may control movement so as to stop, in the case where a distance to a person becomes at least less than a second predetermined distance which is shorter than the first predetermined distance. According to this configuration, because it is made to stop when the distance to a person becomes shorter than a predetermined distance, a person need not go so far as to issue the instruction "stop".

The movement control device may control movement so as to adjust a self movement speed so that a distance to a person is at least greater than the second predetermined distance, in the case where the distance to the person is greater than the second predetermined distance and less than the first predetermined distance. According to this configuration, the distance to a person can be kept within a predetermined range with certainty.

The movement control device may control movement so as to stop in the case where instructions are not recognized in a predetermined time period, and may control movement so as to standby until new recognition is possible. According to this configuration, even when sight is lost of the person who issued an instruction, it becomes possible to receive the instruction for the next action with certainty.

BRIEF DESCRIPTION OF THE SEVERAL VIEWS OF THE DRAWING

FIG. 12 is an explanatory drawing showing a table configuration of the setting file 71 in FIG. 1.

DETAILED DESCRIPTION OF THE INVENTION

A posture recognition apparatus and an autonomous robot according to one embodiment of the present invention is described with reference to the drawings. However, the present invention is not limited to the embodiment, any modifications can be achieved in the scope of the claims.

Figure 1:
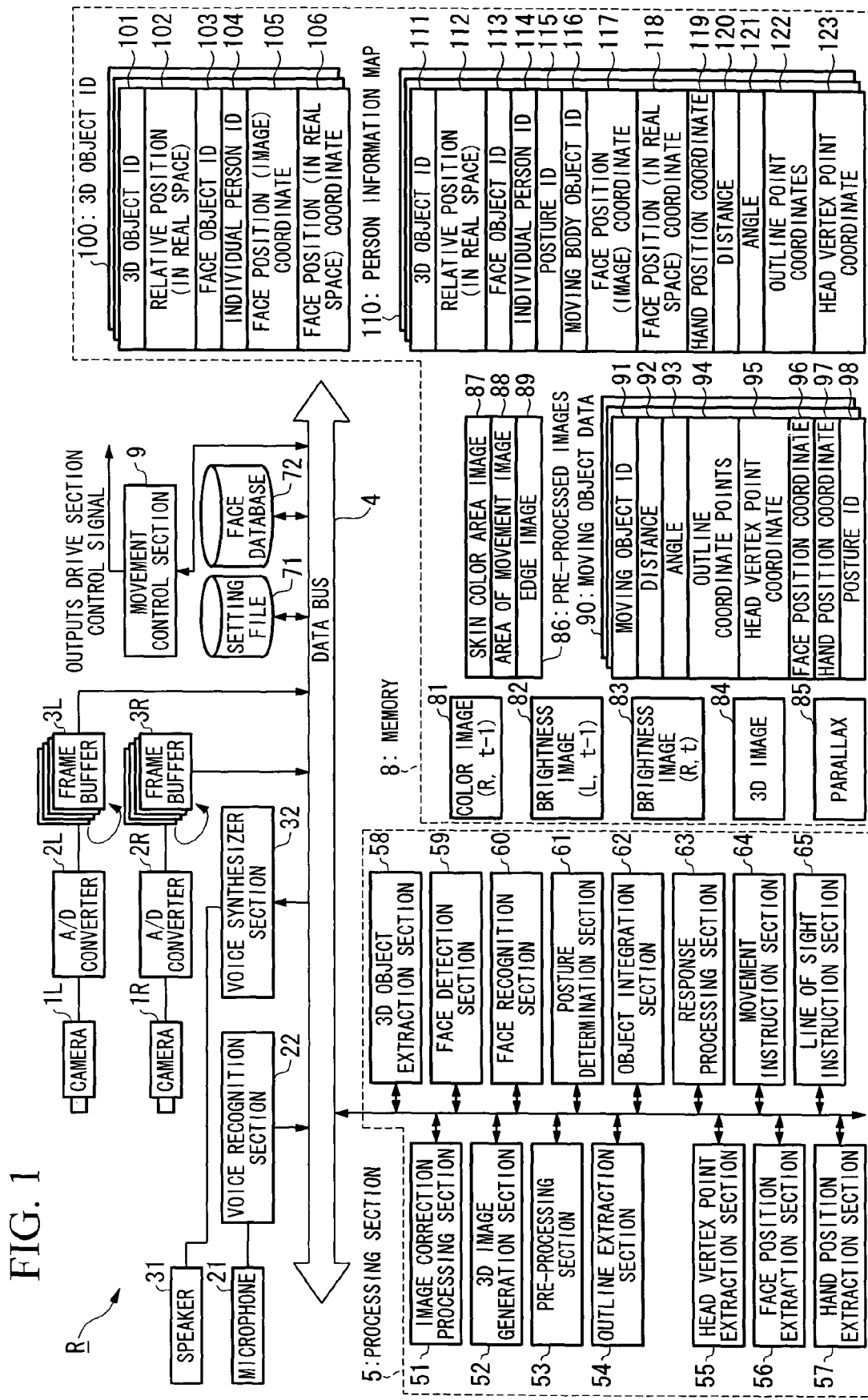
FIG. 1 is a block diagram showing the configuration of one embodiment of the present invention.

FIG. 1 is a block diagram showing the configuration of the embodiment. In this figure, reference symbols R denotes a biped walking autonomous robot. Reference symbols 1L and 1R denote stereo cameras (hereunder called simply cameras) employing 2-color CCDs, with L and R denoting the left side camera and the right side camera respectively. Reference symbols 2L and 2R denote A/D converters which perform sampling and quantization on the respective analog images obtained by the cameras 1L and 1R. Reference symbols 3L and 3R denote frame buffers which respectively store the outputs of the A/D converters 2L and 2R frame by frame. These frame buffers 3L and 3R are ring-buffer type frame buffers that can each continuously store images of the 60 most recent frames. Reference symbol 21 denotes a microphone that picks up the voice of a person speaking. Reference symbol 22 denotes a voice recognition section which recognizes the content of the utterance picked up by the microphone 22 and converts this into a character string. Reference symbol 31 denotes a speaker which emits a synthesized voice to people. Reference symbol 32 denotes a voice synthesizing section which synthesizes voice and outputs the voice from the speaker 31. Reference symbol 5 denotes a processing section which performs a posture recognition process employing mainly image processing. Reference symbol 71 denotes a setting file in which the relationships between human postures and corresponding instructions are pre-defined. Reference symbol 72 denotes a face database in which human facial recognition information is predefined. Reference symbol 8 denotes a memory which stores the data necessary for posture recognition. Reference symbol 9 denotes an action control section that controls the drive parts (head, arms, legs etc.) of the autonomous robot R. Reference symbol 4 denotes a data bus which transmits and receives data between the voice recognition section 22, the voice synthesizer 32, the frame-buffers 3L and 3R, the processing section 5, the setting file 71, the face database 72, the memory 8, and the drive control section 9.

Reference symbol 51 denotes an image correction processing section which performs corrections of calibration and rectification with respect to the images captured by the cameras 1L and 1R, generates a color image 81, a brightness image 82 and a brightness image 83 and stores them in the memory 8. (R, t−1) in the color image 81 shown in FIG. 1 indicates that it is the image for time t−1 (the frame immediately preceding time t) in the right-hand side (R) image. (L, t−1) in the color image 82 indicates that it is the image for time t−1 (the frame immediately preceding time t) in the left-hand side (L) image. (R, t) in the brightness image 83 indicates that it is the image for time t in the right-hand side (R) image. In the following description, the time t indicates the most recent image, and the time t−1 indicates the image frame immediately preceding the most recent image. Reference symbol 52 denotes a 3D image generation section which uses the color image 81, the brightness image 82, and the principle of triangulation, to generate information for a 3D image 84 and parallax 85 and stores this in the memory 8. The 3D image 84 is an image in which distance information is defined for each pixel. Reference symbol 53 denotes a pre-processing section which executes pre-processing in order to simplify subsequent processing, and generates a pre-processing image 86. The pre-processing section 53 executes; processing for extracting a skin color area from the color image 81 and generating a skin color area image 87, processing for extracting an area of movement from the color image 81 and the brightness image 83 and generating an area of movement image 88, and processing for extracting edges from the color image 81 and generating an edge image 89, and stores the respective obtained images in the memory 8. What is described here as skin color, refers to the color of skin which is not covered by clothing. The pre-processing section 53 appropriately selects the most suitable color for the person extraction, and extracts the area of the determined color.

Reference symbol 54 denotes an outline extraction section which extracts an outline from the 3D image 84, the parallax 85, the areas of movement image 88, and the edge image 89, and stores the results of the extraction in the memory 8 as moving object data 90. The number of moving object data 90 stored is just the same as the number of outlines extracted from the images. The outline extraction section 54 assigns a unique moving object ID 91 to each outline of an obtained enclosed area, and stores in the memory 8, a distance to the outline 92, a relative angle 93, and outline nodal-point coordinates 94 which are coordinates on the image of nodal points constituting the outline. Reference symbol 55 denotes a head vertex point extraction section which extracts a head vertex point (the uppermost point of the head) based on the outline nodal-point coordinates 94, and obtains a head vertex point coordinate 95 and stores it in the memory 8. Reference symbol 56 denotes a face position extraction section which extracts a person's face position based on the parallax 85, the edge image 89, the distance 92, and the head vertex point coordinate 95, obtains the face position coordinate 96, and stores it in the memory 8. Reference symbol 57 denotes a hand position extraction section which extracts the position of a person's hand (including hand and arm) based on the parallax 85, the edge image 89, the distance 92, and the face position coordinate 96, obtains the hand position coordinate 97, and stores it in the memory 8.

Reference symbol 58 denotes a 3D object extraction section which extracts objects in three-dimensional space from the 3D image 84 and the color image 81, assigns to each object a unique 3D object ID 101, and stores the relative position 102 of the object in actual space in the memory 8. Reference symbol 59 denotes a face detection section which detects a person's face from the color image 81, the skin-color area image 87, and the relative position 102, obtains face positions 103 and 104 on the image and in real space respectively, and stores them in the memory 8. Reference symbol 60 denotes a face recognition section which recognizes a person's face from the color image 81, the face position (image) 103, the face position (actual space) 104, and face data defined in the face database 72, and obtains a face ID 105 and stores it in the memory 8. Reference symbol 61 denotes a posture determination section which determines a person's posture based on the face position coordinate 96 and the hand position coordinate 97 of the moving object data 90 and the contents defined in the setting file 71. Reference symbol 62 denotes an object integration section which associates the moving object data 90 and the 3D object data 100, and generates a person information map 110. Reference symbol 63 denotes a response processing section which refers to the person information map 110 and initiates movement in response to a person. Reference symbol 64 denotes a movement instruction section which creates instructions for movement based on the output from the response processing section 63 and on the 3D object data 100, and outputs them to the movement control section 9. Reference symbol 65 denotes a line of sight instruction section which creates instructions for the direction of the line of sight based on the output from the response processing section 63 and on the moving object data 90, and outputs them to the movement control section 9.

Figure 23:
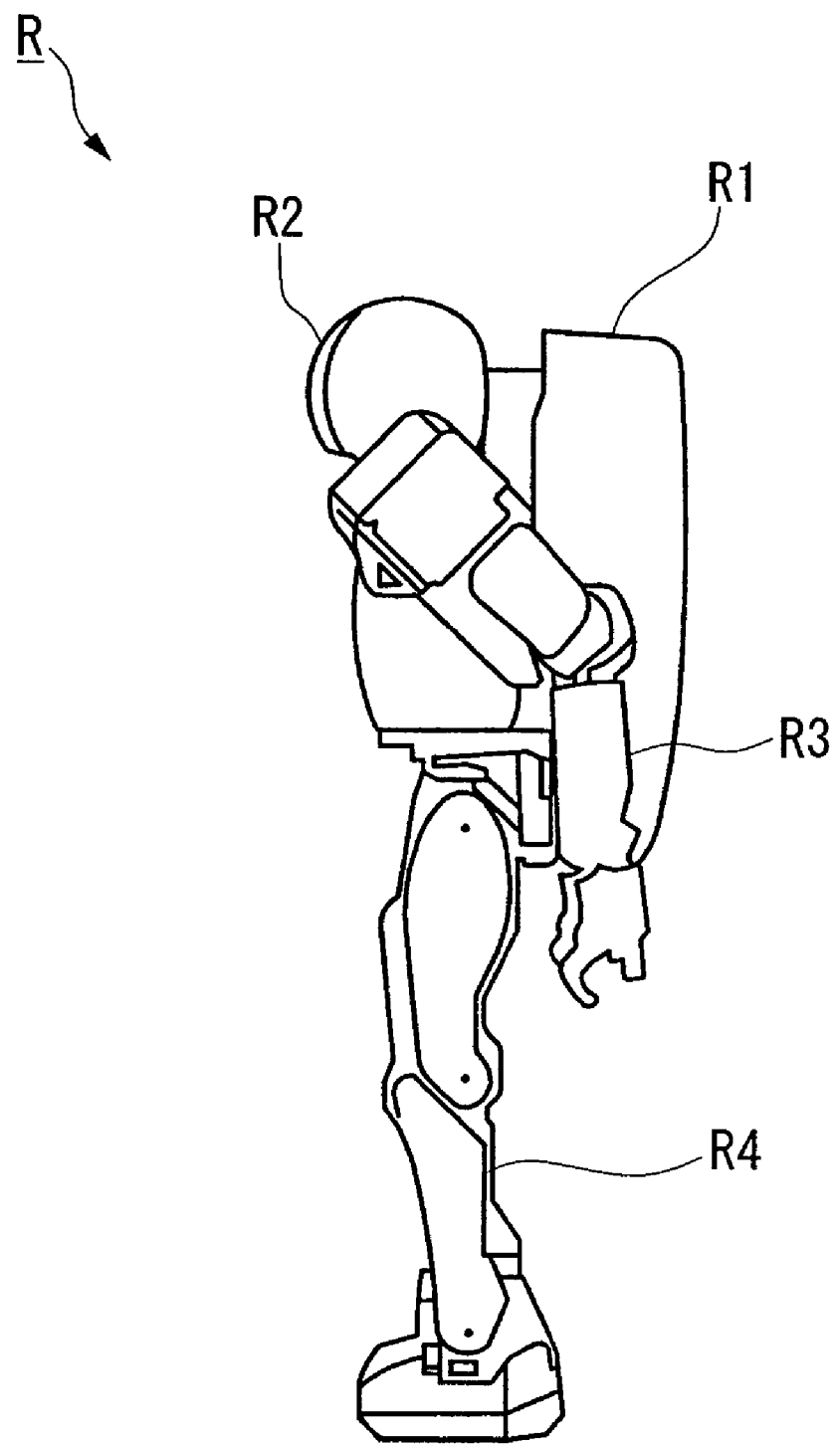
FIG. 23 is an explanatory drawing showing an outward view of the autonomous robot.

The configuration of the autonomous robot R will be briefly described. FIG. 23 is an explanatory drawing showing the outward appearance of the autonomous robot R. In this figure, reference symbol R1 denotes a control-apparatus carrying section in which the processing section 5, the memory 8, and the action control section 9 are installed.

Reference symbol R2 denotes a head section equipped with the cameras 1L, 1R, the A/D converters 2L, 2R, the frame buffers 3L, 3R, the microphone 21, the voice recognition section 22, the speaker 31, and the voice synthesizing section 32. Reference symbol R3 denotes an arm section, and reference symbol R4 denotes a leg section. The movements of the head section R2, the arm section R3, and the leg section R4 are controlled according to a drive section control signal which is output from the action control section 9.

<First Posture Recognition Operation>

Figure 2:
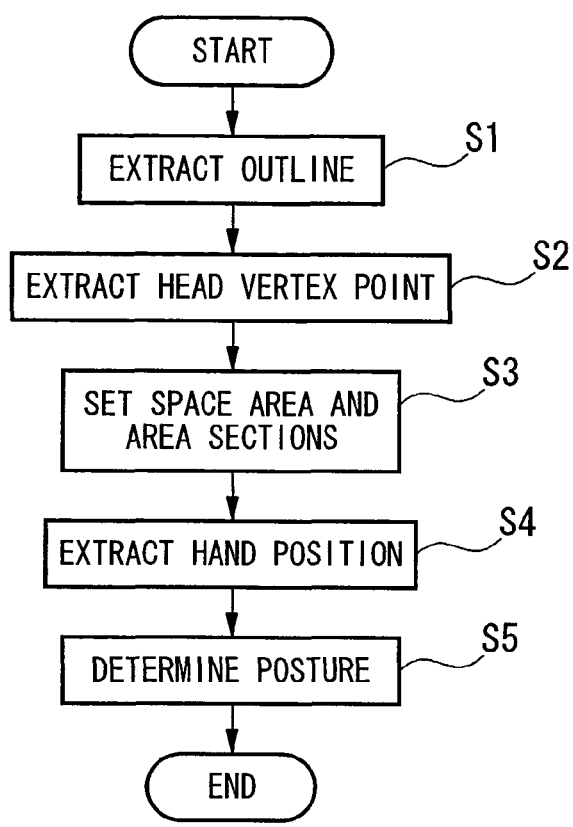
FIG. 2 through FIG. 9 are flowcharts showing the operations of the processing section 5 shown in FIG. 1.
Figure 3:
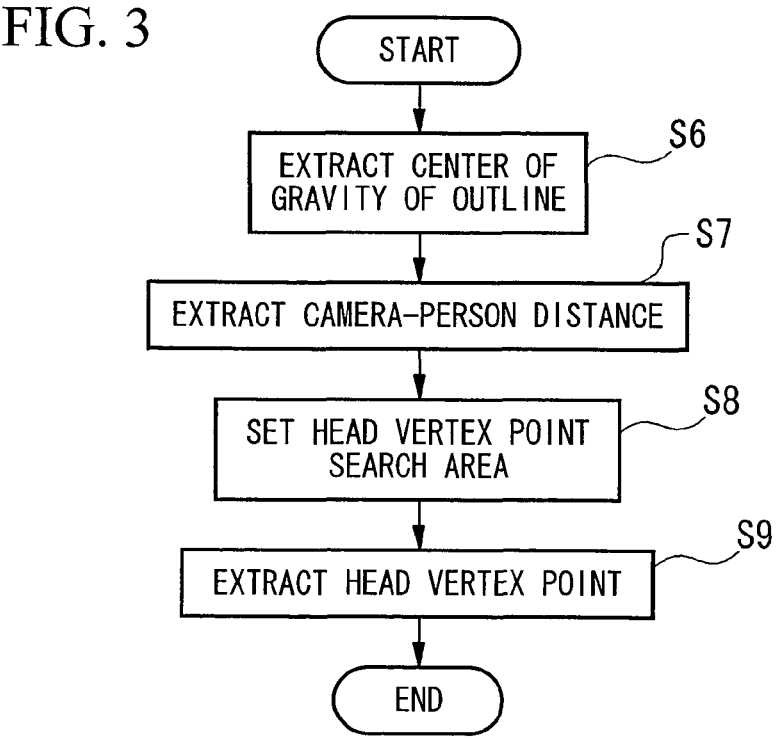
Figure 4:
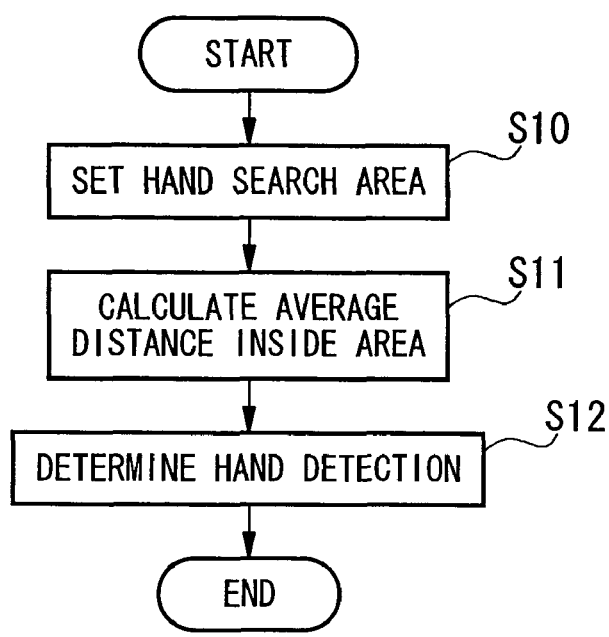

The following is a description of the operations of the apparatus illustrated in FIG. 1. To begin, the first posture recognition operation is described with reference to FIG. 2 to FIG. 4. First of all, sampling and quantization processing of the analog images captured by the cameras 1L and 1R is carried by the A/D converters, 2L and 2R, and the results then stored into the frame buffers 3L and 3R. This operation is continuously repeated regardless of the operation status of the processing section 5, and the images of the 60 most recent frames are stored into the two frame buffers 3L and 3R. Meanwhile, the image correction processing section 51 reads the most recent image (time t) and the immediately preceding image (time t-1) from the frame buffers 3L and 3R, applies correction processing to the images, and then stores the result as the color image 81, and the brightness images 82 and 83 in the memory 8.

Then the 3D image generation section 52, generates the 3D image 84 from the color image 81 and brightness image 82, and stores it in the memory 8. To continue, the pre-processing section 53 performs pre-processing and generates the pre-processed image 86 and stores it in the memory 8.

Next, the outline extraction section 54 employs a technique such as the Snake Technique to carry out dynamic outline extraction, and extracts (step S1) and outputs the outlines of segments which have a high potential of being a person. The Snake Technique makes characteristic use of an outline curve model based on dynamic closed curves called Snakes, and has the characteristic of enabling extraction of the shape of the target body even if the shape of the object in the image is changing with time. These Snakes set an energy function according to their position and shape so that the energy becomes a minimum when the shape of the target body matches the shape of the Snake. Specifically this is defined by the sum of, an internal energy for the smoothness of the curve, an energy value for the error between the curve and the target object, and an energy for the external force of constraint, and so on. By dynamically adjusting the position and shape with respect to the outline of a target object in the image, until the energy reaches a local minima, it becomes possible to handle the problem of shape profile extraction as an optimization problem, namely energy minimization. As a result, areas in the image having a high potential of being people can be obtained. By this process, the moving object ID 91, the distance 92 to the object, the relative angle 93 to the object, and the outline nodal point coordinate 94 can be obtained.

In a case where there are several moving objects in one image, the above outline extraction process separates and extracts the outline of each moving object, and stores each one of the separated and extracted outlines as respective moving object data 90 in the memory 8. These separated moving objects represent a plurality of candidates for persons. As a method for separating and extracting a plurality of moving bodies, the known method for outline extraction described in Japanese Unexamined Patent Application, First Publication No. 2002-92622 can be used. Outline extraction methods of other techniques may be employed.

Figure 10A:
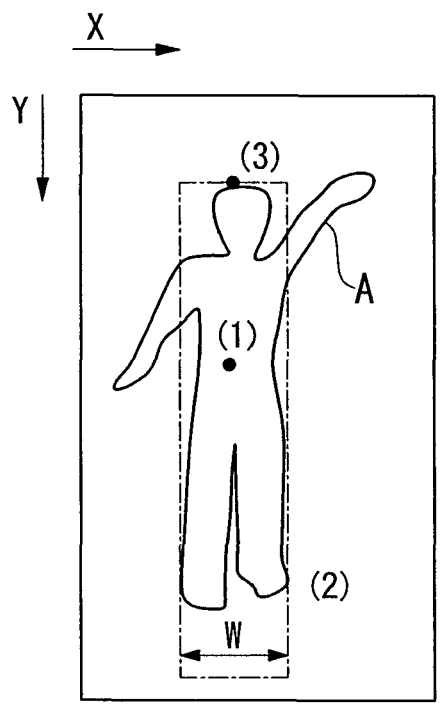
FIGS. 10A, 10B, and 11 are explanatory drawing showing the operations of the processing section shown in FIG. 1.

Next, the head vertex point extraction section 55 extracts a head vertex point which becomes the vertex point of the outline, based on the outline nodal point coordinates 94 (step S2). The operation of extracting the vertex point is described with reference to FIG. 3 and FIG. 10A. In FIG. 10A, reference symbol A denotes the outline obtained from the outline nodal point coordinate 94. First, the center of gravity position (1) of the area enclosed by this outline is obtained (step S6). Then the average distance of pixels within the outline is obtained with reference to the distance image (step S7). Next, a head vertex point search area is established (step S8). For this, ½ of a predetermined average human shoulder width W is added to and subtracted from the x-coordinate of the outline center of gravity, to obtain the x-coordinate values, and vertical lines (2) passing through these two x-coordinate values are obtained. The search area is the area enclosed by the two vertical lines. Then the uppermost point within the search area is made the head vertex point (3) (step S9). The head vertex point coordinate 95 obtained here is stored in the memory 8.

Figure 11:
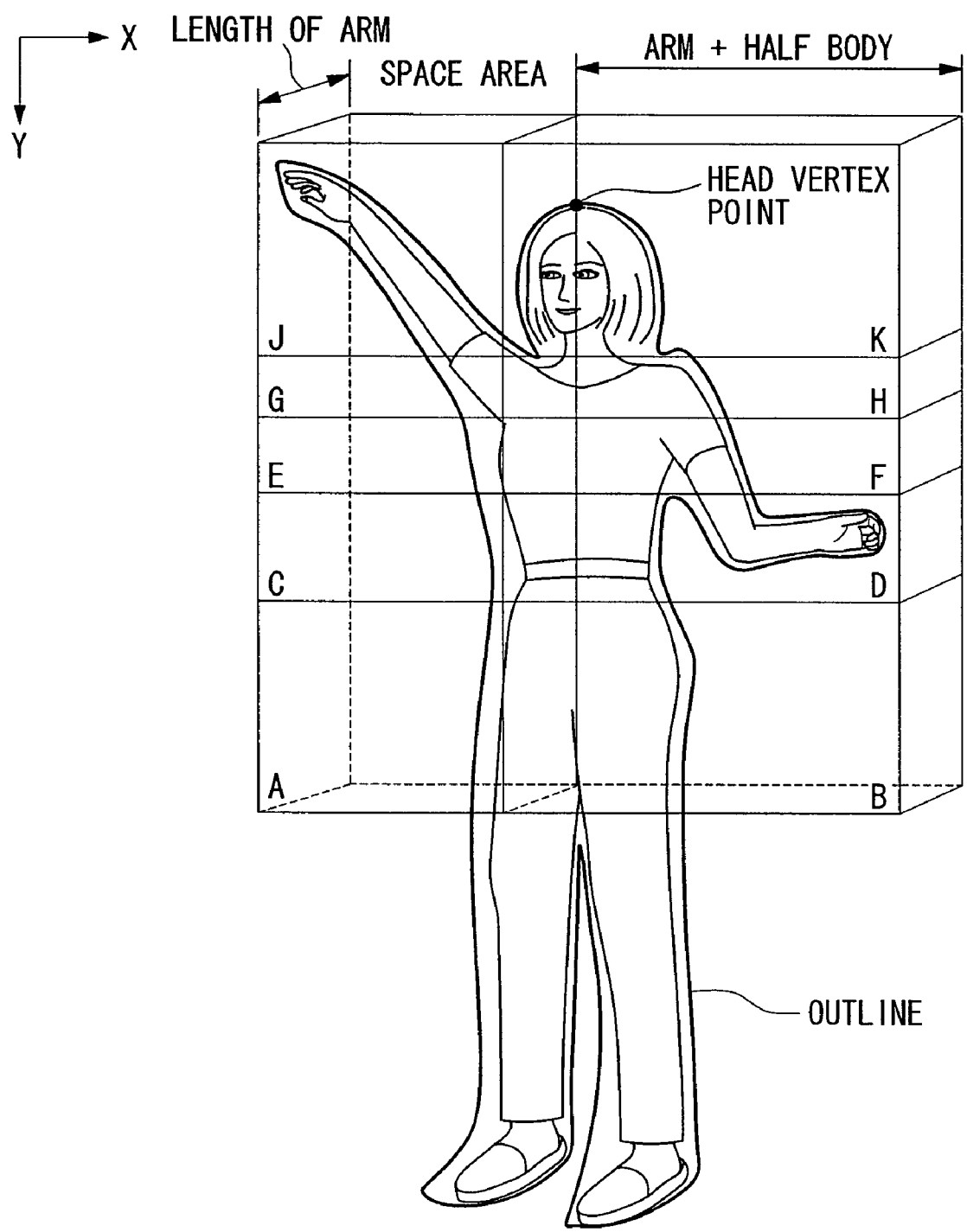

Next, the posture determination section 61 performs setting of space area and the area sections based on the head vertex point coordinate (step S3). The space area and the area sections are described with reference to FIG. 11. FIG. 11 is an explanatory drawing showing the space area and the area sections. As shown in FIG. 11, taking the head vertex point as a reference, the space area is the area inside a range which both arms of a person reach, divided logically into a plurality of areas in the image, and what is assigned with an identifier in this space area is the area section. This example is an example of 10 divisions (A to K). The x-direction size of the outside frame of the space area is determined from the length of the arm and half the body, and the distance and direction is determined from the length of the arm. The space area and area sections set here are held inside the posture determination section 61.

Next, the hand position extraction section 57 extracts the position of the hand within the outline extracted by the outline extraction process (step S4). The hand position extraction operation is described with reference to FIG. 4. The hand position extraction section 57 sets the hand search area, based on the head vertex point coordinate and the range which both the left and the right hands reach (step S10). Subsequently, the hand position extraction section 57 obtains an average distance of pixels within the outline extracted by the outline extraction and existing inside the previously set hand search area (step S11). The hand position extraction section 57 determines to deem this skin color area to be the hand if the average distance obtained here falls inside a range of the average distance of the entire outline ±α (step S12). Here α denotes the length of arm. The extracted hand position coordinate is stored in the memory 8 as the hand position coordinate 97.

Next, the posture determination section 61 determines where the obtained hand position coordinate 97 exists within the previously set space area A to K. The posture determination section 61 then refers to the area section obtained as a result of this determination, and the postures stored in the setting file 71, and determines the posture of the person (step S5). FIG. 12 shows an example of a table stored in the setting file 71. As shown in FIG. 12, the area section and its corresponding posture are defined in the setting file 71, and a unique posture ID is assigned to each posture. For example the area sections A and B denote a posture which is about to perform a "hand shake", the area sections C and D denote a posture indicating an instruction to "pay attention", and the area sections E and F denote a posture indicating an instruction to "stop". The area sections G and H denote a posture indicating instructions of "step to the right or step to the left", and the area sections J and K denote a posture indicating "good bye". A priority level is set to each posture, and in the case where two postures are determined, the posture whose priority level number is smaller is prioritized and made the determination result. For example, in the case where the two hands of a single person are recognized as being in a different posture, the instruction of the hand with the smaller priority level number is prioritized. The posture ID 98 obtained as a result of the posture determination is stored in the memory 8. The content of the table stored in the setting file 71 is set by the operator inputting from a keyboard or the like, which is not illustrated.

By repeatedly executing the aforementioned operations as many times as the number of the moving object data 90 stored in the memory 8, it is possible to recognize postures of every person captured in an image. Because each person can be separated and extracted even in cases where there is a plurality of persons, by judging the perspective of each outline in the 3D image 84, then even if there is skin color in the background, processing of this as the hands and faces of the recognition target can be avoided.

<Second Posture Recognition Operation>

Figure 5:
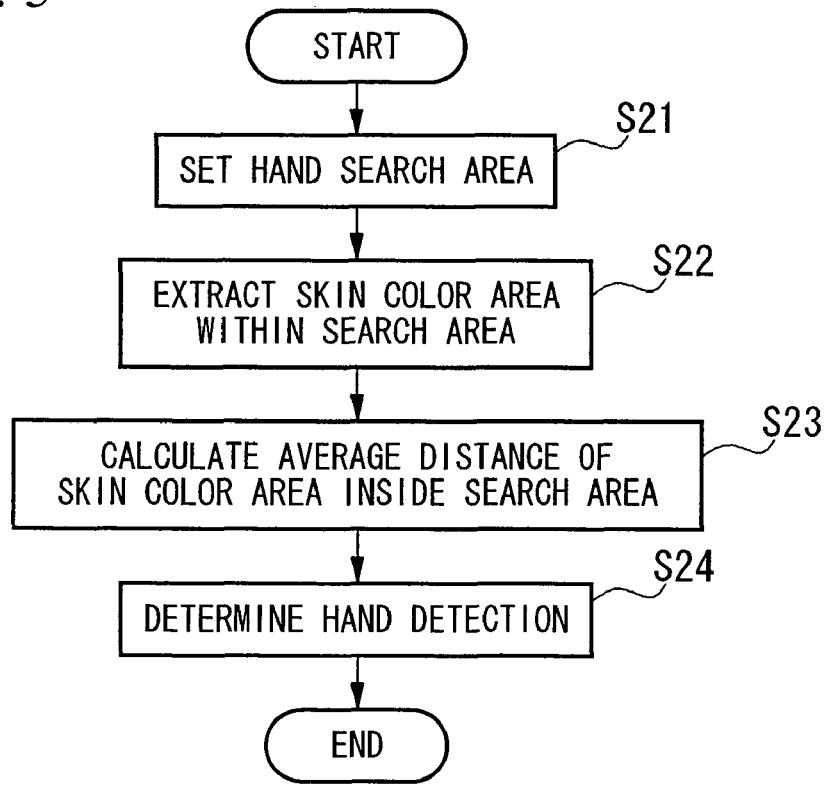

Next, the second posture recognition operation is described with reference to FIG. 5. FIG. 5 is a diagram showing operation details of the hand position extraction (step S4) shown in the FIG. 2. This corresponds to the hand position extraction operation of the posture recognition operation shown in FIG. 4.

First of all, the hand position extraction section 57 sets a hand search area based on the head vertex point coordinate 95 and the range which the left hand and the right hand reach (step S21). Next, the hand position extraction section 57 extracts a skin color area within the search area, based on the skin color area image 87 obtained in the previous processing and the previously obtained hand search area (step S22). Then the hand position extraction section 57 refers to the 3D image 84, and obtains an average distance of pixels in the skin color area obtained here (step S23). The hand position extraction section 57 determines to deem this skin color area to be the hand if the average distance obtained here falls inside a range of the average distance of pixels in the entire outline ±α (step S24). Here α denotes the length of arm. The extracted hand position coordinate is stored in the memory 8 as the hand position coordinate 97.

The second posture recognition operation is the same operation of the first posture recognition operation except for the hand position extraction operation shown in FIG. 5.

<Third Posture Recognition Operation>

Figure 6:
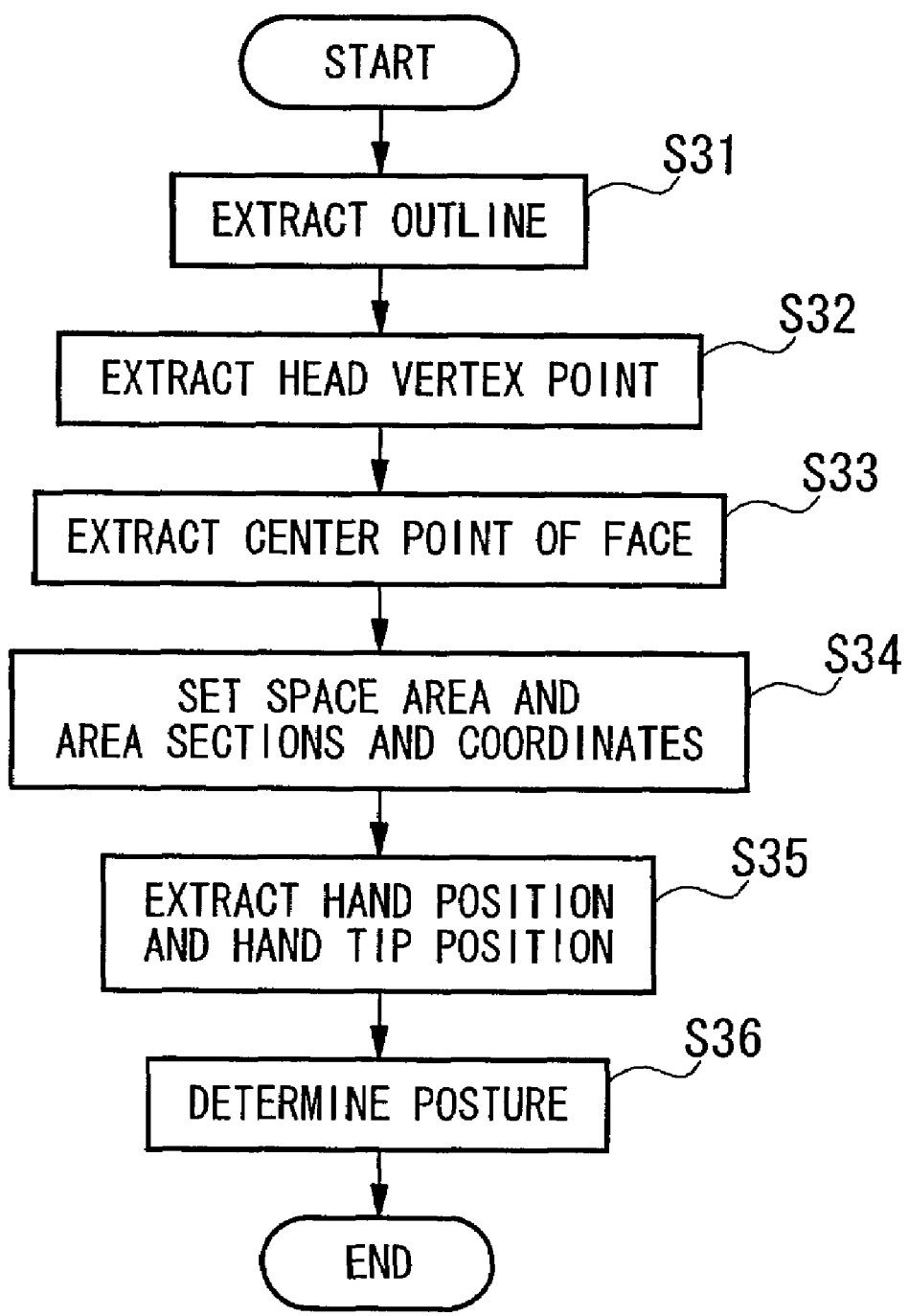
Figure 7:
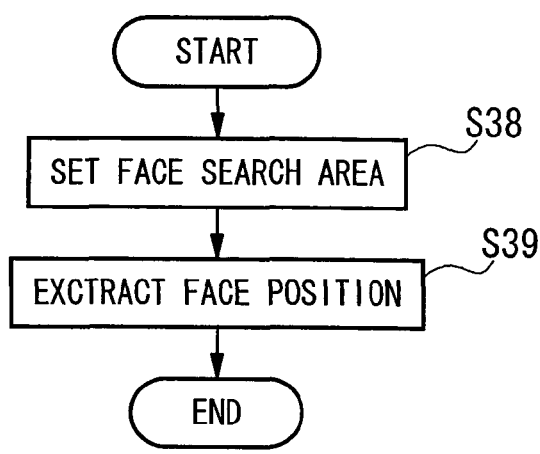
Figure 8:
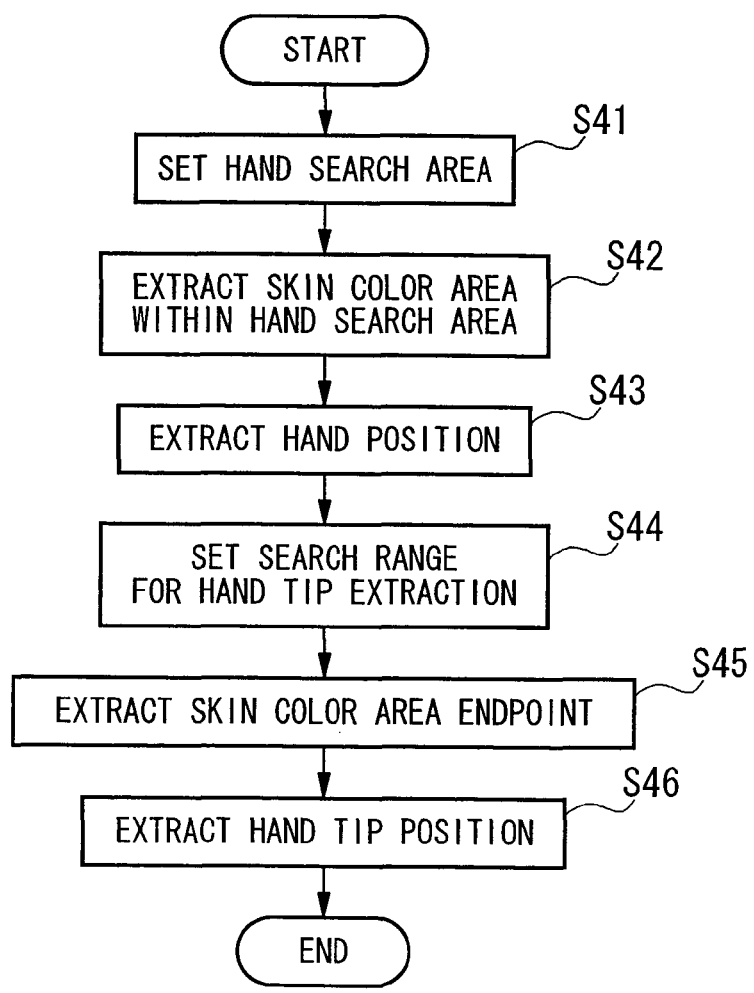

Next, the third posture recognition operation is described with reference to FIG. 6, FIG. 7, and FIG. 8. First of all, the outline extraction section 54 performs dynamic outline extraction employing the snake technique, and extracts and outputs outlines of parts having a high potential of being a person (step S31).

Next, the head vertex point extraction section 55 extracts a head vertex point (step S32). Since the operation here is identical with the first operation, detailed description is omitted. The head vertex point coordinate 95 obtained here is stored in the memory 8.

Figure 10B:
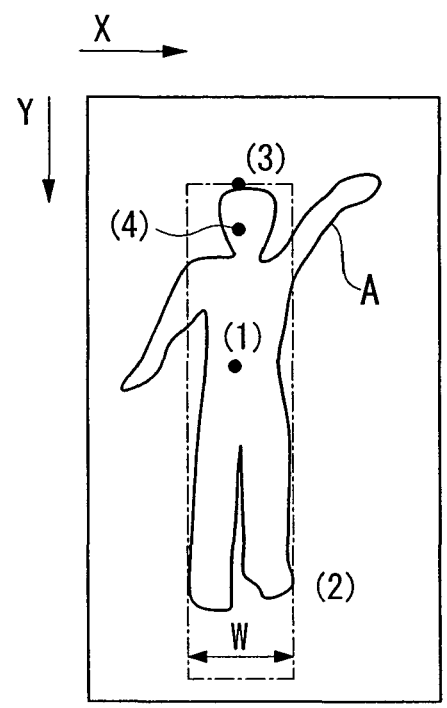
Figure 13:
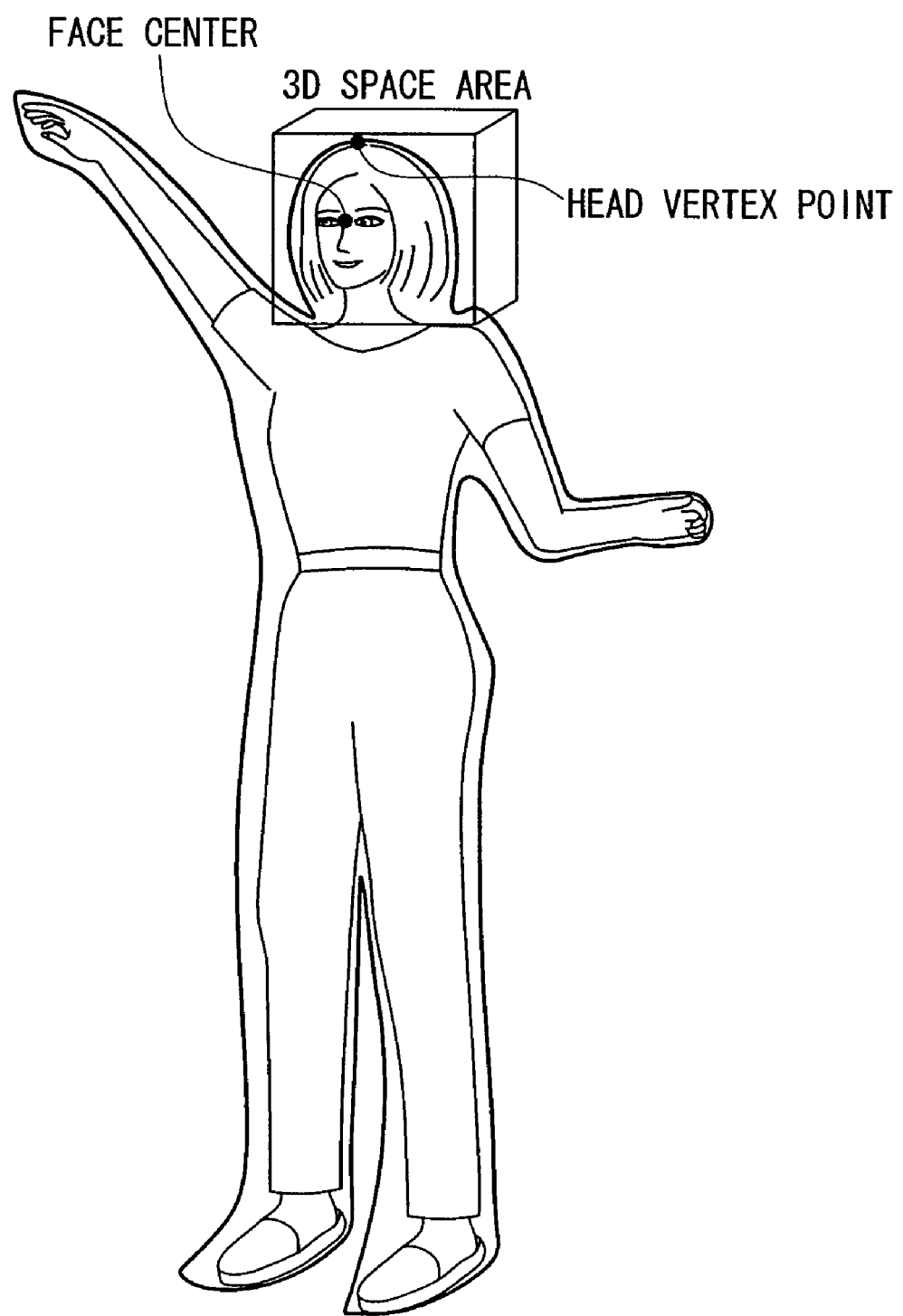
FIG. 13 is an explanatory drawing showing the operations of the processing section 5 shown in FIG. 1.

Next, the face position extraction section 56 extracts the center point of the face of a person (step S33). The operation for extracting the center point of a face is described with reference to FIG. 7, FIG. 10, and FIG. 13. First of all, the face position extraction section 56 sets a face search area (step S38). This face search area is set by referring to the previously obtained head vertex point coordinate 95, and by logically defining a 3D space area with the upper most edge at the head vertex point, based on a predetermined standard face size. Next, the face position extraction section 56 refers to the skin color image 87 and extracts a skin color area within the preset face search area, and extracts the center of this skin color area as a face position (step 39). As a result the face position (4) shown in FIG. 10B has been extracted.

Next, the posture determination section 61 performs the setting of the space area and the area section based on the head vertex point coordinate 95 (step S34). Because this space area and the area section are identical with those mentioned before, detailed description is omitted here.

Next the hand position extraction section 57 extracts the hand position and hand tip (the part below the wrist) (step S35). The hand position extraction operation and the hand tip extraction operation are described with reference to FIG. 8. The hand position extraction section 57 sets a hand search area based on the head vertex point coordinate 95 and the range which the left and right hands reach (step S41). At this time, the face search area set in step 38 is excluded. Next, the hand position extraction section 57, on the basis of the skin color area image 87 obtained in pre-processing and the previously set hand search area, extracts the skin color area within the hand search area (step S42). Next the hand position extraction section 57 refers to the 3D image 84, and obtains an average distance of pixels in the skin color area obtained here. The hand position extraction section 57 determines to deem this skin color area to be the hand if the average distance obtained here falls inside a range of the average distance of pixels in the entire outline ±α (step S43). Here a denotes the length of arm.

Next, the hand position extraction section 57 sets the search range for hand tip position extraction taking as a basis the center of the skin color area deemed to be a hand in step 43 (step 44). This search range is set by referring to the 3D image 84 and estimating the length of a person's arm. Next the hand position extraction section 57 extracts the peripheral nodes of the relative position of the outline of the skin color area inside the search range for hand tip position extraction (step 45). In the case where the distance between the hand tip position obtained in step 43 and the face is larger than a predetermined threshold, the furthest peripheral point of the obtained peripheral points from the face center is extracted as the hand tip position (step S46). On the other hand, in the case where it is smaller than the threshold, the elbow is deemed to be bent, and the peripheral node closest to the face center is extracted as the hand tip position. This hand tip position coordinate is stored in the memory 8 as the hand tip position coordinate 97.

Next, the posture determination section 61 determines where the hand position coordinate 97 exists within the previously set space area A to K. The posture determination section 61 then refers to the area section obtained as a result of this determination, and the postures stored in the setting file 71, and determines the posture of the person (step S36). This posture determination result is stored in the memory 8 as the posture ID 98.

<Posture Recognition Operation in the Case Where a Plurality of Persons are Present>

Figure 9:
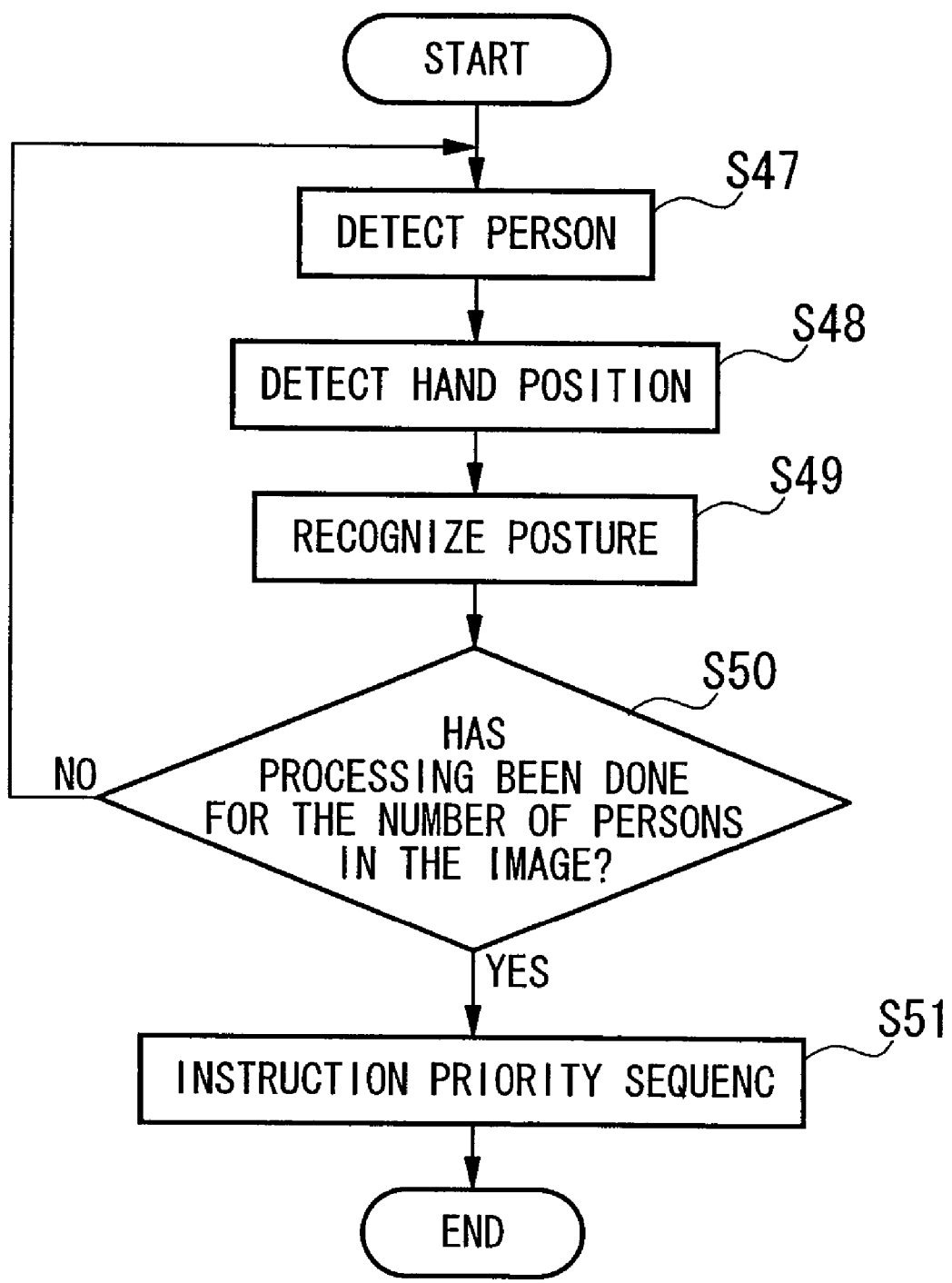

Next, the operation of posture recognition in the case where a plurality of persons are in the surroundings is described with reference to FIG. 9. FIG. 9 is a flowchart showing the posture recognition operation in the case where a plurality of persons are in the surroundings. Here, as an example, the description is for where two persons are captured in the obtained image. First, by means of the aforementioned operation, detection of a person is performed (step S47). Next, position detection of the hand of the person detected in the step S47 is performed (step S48). This position detection of the hand is performed by the aforementioned operation. Next, based on the results of the position detection of the hand in the step S48, posture recognition is performed (step S49). This posture recognition is performed by the aforementioned operation. Determination is made as to whether the processing for the number of persons on the image has been performed, and posture recognition for all the persons on the image is repeatedly performed (step S50).

By means of this operation (steps S47 to S50), the person information for the number of persons is stored inside the moving object data 90. In this example, moving object data for two persons is stored in the movement object data 90.

Next, the posture determination section 61 determines the instruction priority (step S51). This instruction priority determines which instruction is to be obeyed in the case where a plurality of persons take predetermined positions. The priority of the instruction to be obeyed is predetermined, and in principle is the instruction of the person who is closest to the center of the image. However, in the case where the instruction of a person other than the person near the center of the image is an instruction meaning "stop", this instruction is prioritized and obeyed, and self movement operations are stopped. Control is such that there is no movement until receiving the next instruction. In the case where the instructions of a particular person should be prioritized, the instructions of a person whose face is recognized based on the recognition result of the face recognition section 60 can be prioritized. Moreover, the instructions of a particular person such as the owner may be prioritized.

In this way, even in the case where a plurality of persons are present in the surroundings, because detection of every person, position detection of their hands, and posture recognition has been performed, it becomes possible to recognize the issued instructions of each person. Furthermore, even in the case where there is a plurality of people, because priority processing of the instructions has been performed, instructions can be recognized with certainty.

In this processing, there are two limiting matters. The plurality of persons in the image must be at least one arms length apart. Furthermore, in the recognition of a first person behind a second person in front of the first person, a hand of the first person which is not hidden by the second person should be the recognition target.

The space area shown in FIG. 11 can be further subdivided in the distance direction from the cameras 1R and 1L. In this case, the table shown in FIG. 12 needs only define postures corresponding to the number of subdivided sections. By so doing, it becomes possible to distinguish postures in which the person puts their hand in front and those in which the person puts their hand behind. The pitch of the subdivided sections can be determined based on the resolution of the obtained distance image. It is also possible not to define any postures for a part of divided sections in the table stored in the setting file 71. In this case, posture recognition is not performed when a hand is positioned in these undefined areas.

In this way, outline extraction is applied to the extraction of a target person in performing posture recognition while referring the distance image. Therefore, even in the case where a plurality of persons are present in the field of vision, posture recognition of the target person can be carried out with certainty. The characteristic features such as the face and the hands of a person are detected from the extracted outline information, and the posture of the person is recognized from the relative positions of these characteristic features. Therefore, posture recognition that is highly reliable and able to be processed at high speed can be realized.

<Response Processing Operations>

Figure 14:
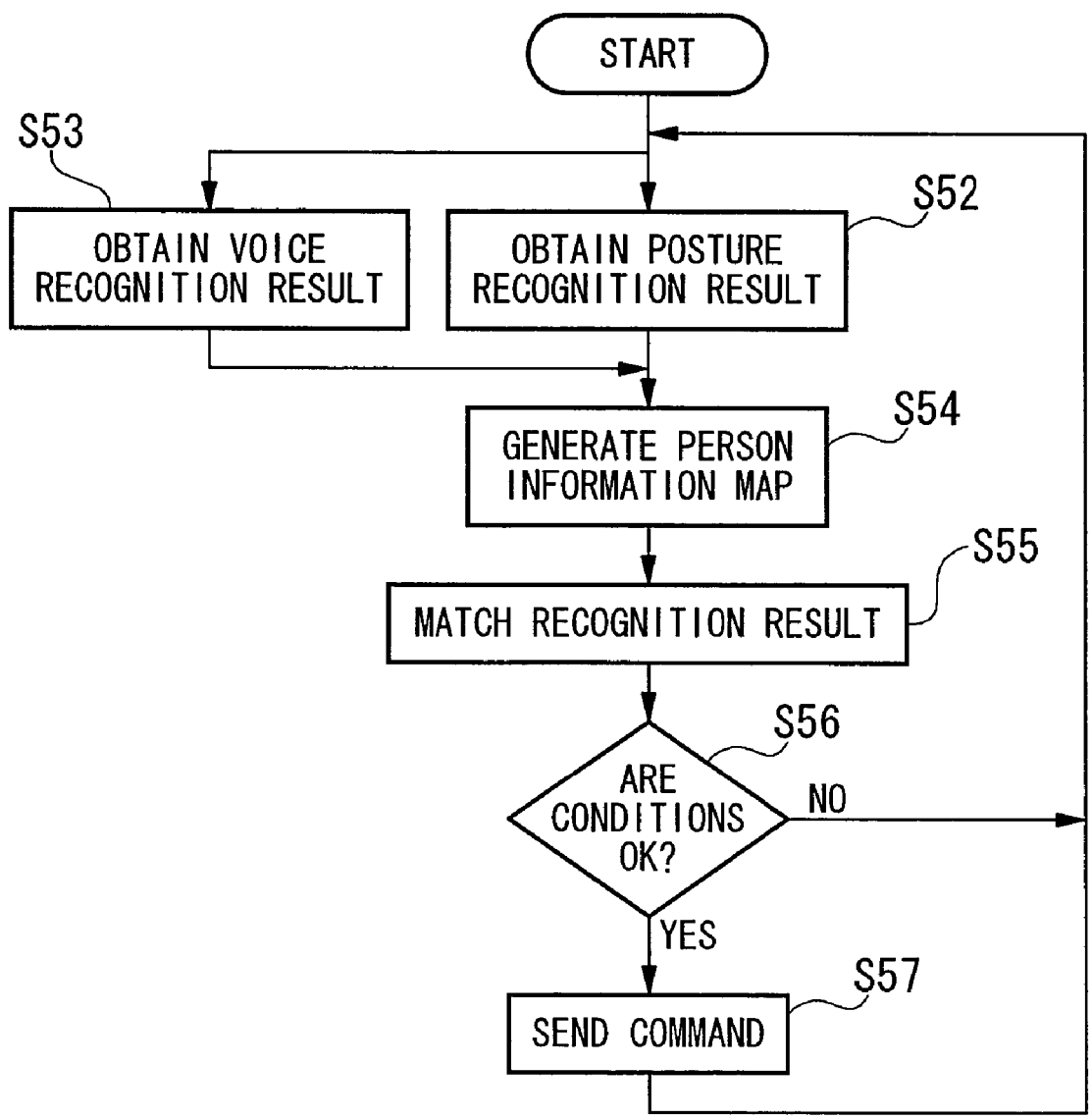
FIG. 14 through FIG. 21 are flowcharts showing the operations of the processing section 5 shown in FIG. 1.

Next, referring to FIG. 14 through FIG. 22, operations where the autonomous robot R performs response actions based on the postures determined by the posture determination section 61 are described. FIG. 14 is a flowchart showing the basic operations for response. Here, instructions corresponding to each posture are predetermined as below.

(1) When the instruction "come" is received, the robot R follows the person who issued the instruction, so as to fulfill predetermined conditions. The predetermined conditions are for example: in the case where the autonomous robot R is to move while steadily maintaining a distance between itself and the person; to move so that a distance for ensuring safety is a first predetermined distance (for example 150 cm)", "In the case where the distance to the person becomes less than a second predetermined distance (for example 90 cm); to stop", and "In the case where the distance to the person is greater than the second predetermined distance (for example 90 cm) and less than the first predetermined distance (for example 150 cm); to retreat or to adjust its stride to match."

(2) When the instruction "stop" is received, the robot R stops immediately.

(3) When the instruction "shake hands" is received, the robot R shakes hands with the person who issued the instruction.

(4) When the instruction "goodbye" is received, the robot R waves its hand to the person who issued the instruction.

(5) When sight of the person who issued the instruction is lost, the robot R stop self automation and stands by until a new instruction is received.

The instructions corresponding to the posture can be a combination of the above actions (1) through (5).

Next, the response processing section 63, obtains from the memory 8 the posture ID 98 which is the determined result of the posture determination section 61 (step S52). Then, the response processing section 63 obtains from the voice recognition section 22 the instruction which is the voice recognition result (step S53). The instructions obtained here are retained inside.

Meanwhile, the 3D object extraction section 58 extracts a 3D object from the 3D image 84 and the color image 81, and stores a 3D object ID 101 assigned to this 3D object and a relative position (real space) 102 for the 3D object in the memory 8. On receiving this, the face detection section 59 detects the skin color from color image 81, assigns a face object ID 103 to the face extracted by the face outline (ellipse), obtains the position of this face, and stores the face position coordinates 105 and 106 in the memory 8. The face recognition section 60 picks out only the face part from the color image 81, based on the face position coordinates 105 and 106, and obtains a face feature vector. The face recognition section 60 searches the face database 72 based on the data similar to the obtained feature quantity, and in the case where corresponding face data exists, stores the individual person ID 104 assigned to the corresponding face data in the memory 8. The generation operation for the 3D object data 100 described here is repeatedly carried out regardless of the other processing status.

Next, the object integration section 62 relates the moving object data 90 and the 3D object data 90, generates the person information map 110, and stores it in the memory 8 (step S54). The person information map 10 defines the relative position between the person and the autonomous robot R, in order to grasp where the person issuing instructions currently is. The person information map 110 includes: an individual person ID 111 for uniquely specifying persons, a relative position to self 112, a face object ID 113, an individual person ID 114, a posture ID 115, a moving object ID 116, a face position coordinate 117 in an image, a face position coordinate 118 in the real space, a hand position coordinate 119, a distance to self 120, a relative angle to self 121, an outline contact point coordinate 122, and a head vertex point coordinate 123. These values are not obtained anew but rather each value is copied when the moving object data 90 and the 3D object data 100 are related.

Figure 15:
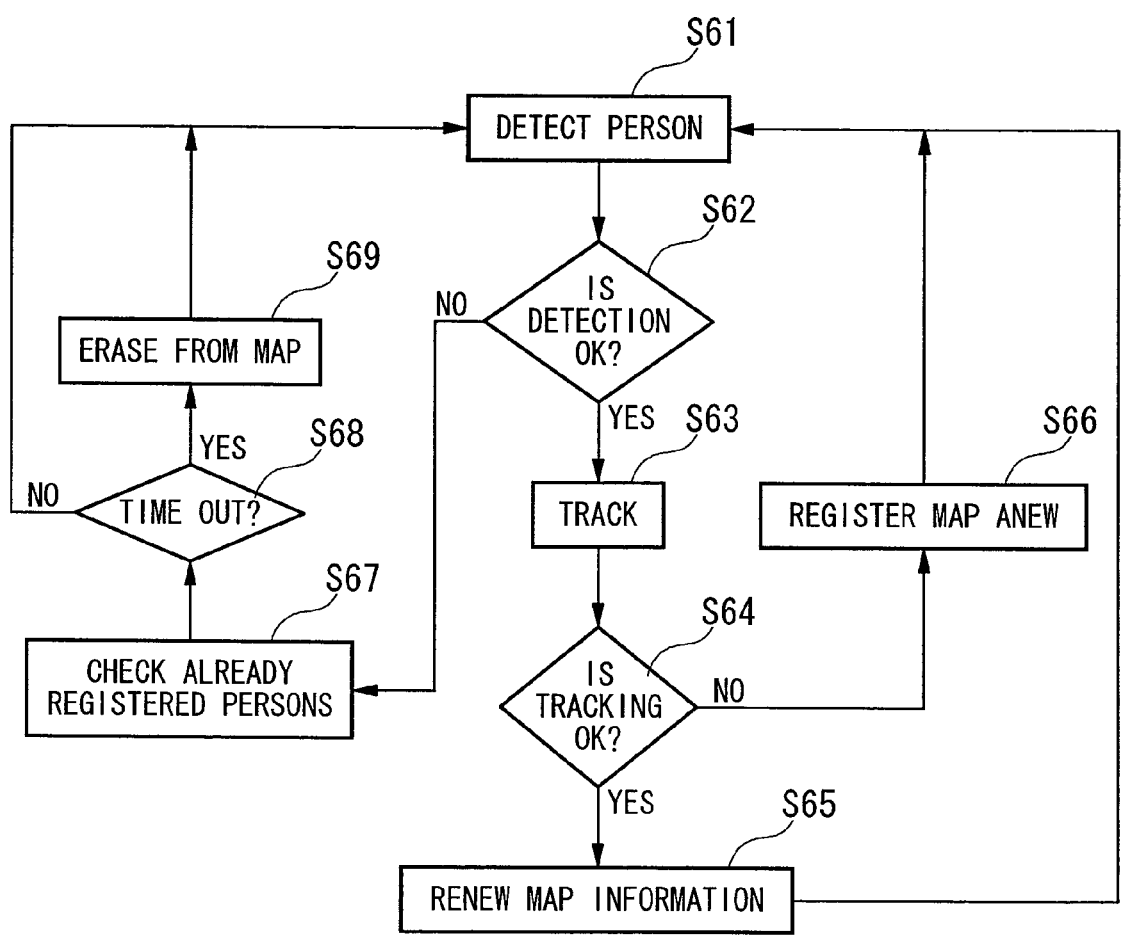

The operation for renewing the person information map in the object integration section 62 is described with reference to FIG. 15. First, it is determined whether or not a person has been detected (steps S61 and S62). If a person is detected, tracking processing is carried out (step S63), and it is determined whether tracking could be done or not (step S64). In the case where tracking could be done, the person information map 110 is renewed moment by moment according to the tracking (step S65). On the other hand, in the case where tracking could not be done, a map is registered anew (step S66). In the case where detection of persons in step S62 could not be done, the persons already registered are checked (step S67). If detection is not done within a fixed time, the data of the person is erased from the map (step S68, step S69). Thus, the information relating to persons surrounding the robot is renewed moment by moment while carrying out the relating of moving object data 90 and 3D object data 90.

Next, the response processing section 63 refers to the person information map 110 which changes moment by moment, and matches the recognition results (instructions) (step S55). It is then determined whether the conditions are fulfilled or not (step S56). If these conditions are fulfilled, it sends a control command for causing movement to the movement instruction section 64 or the line of sight instruction section 65 (step S57). As a result, movement instructions and line of sight instructions are sent to the action control section 9 and the drive section operates.

Next, taking as an example the case where the instruction "come" has been issued from the person issuing the instruction, the operations of the response processing section 63, the movement instruction section 64 and the line of sight instruction section 65 are described.

Figure 16:
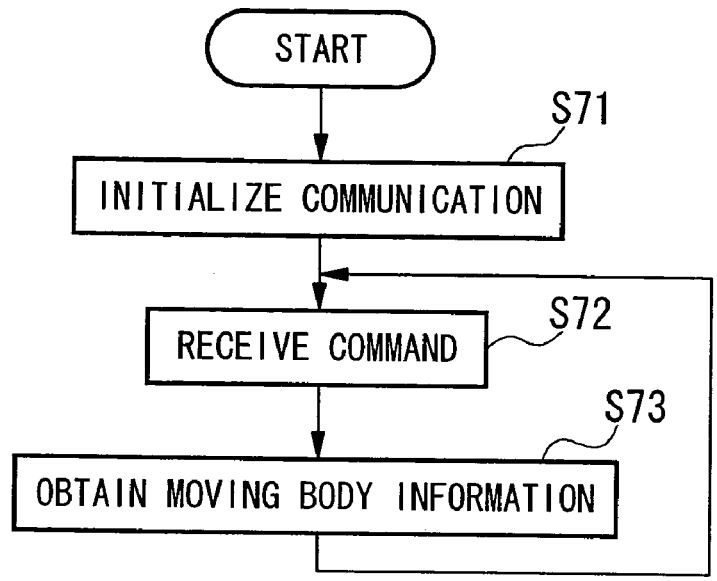
Figure 17:
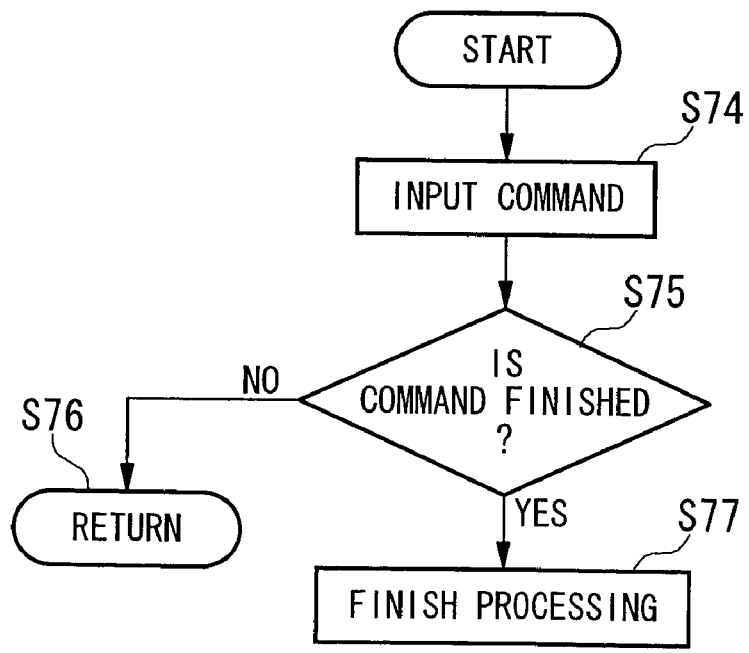
Figure 18:
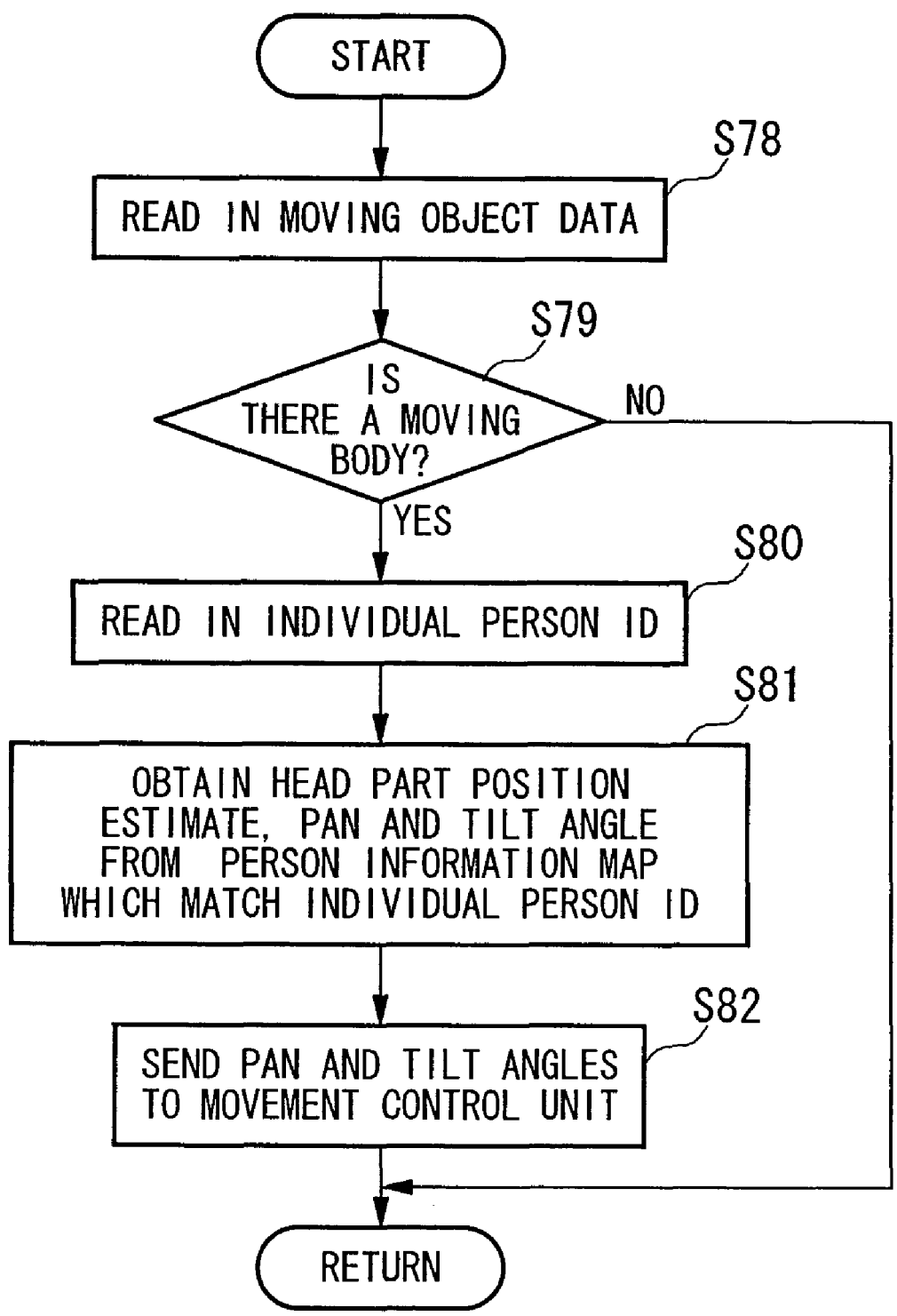

To begin, referring to FIG. 16, FIG. 17 and FIG. 18, the operation by which the line of sight instruction section 65 adjusts the direction of line of sight (the optical axis direction of the cameras) is described. First, the line of sight instruction section 65 initializes communication between the other processing sections (step S71). Then, the line of sight instruction section 65 receives the command output from the response processing section 63 (step S72). The line of sight instruction section 65 acquires the moving body (person) information (step S73). The line of sight instruction section 65 executes step S72 and step S73 repeatedly.

Next, referring to FIG. 17, the command receiving processing in step S72 shown in FIG. 16 is described. First, the line of sight instruction section 65 inputs the command output from the response processing section 63 (step S74). It is then determined whether the command is completed or not. If the command is completed, processing ends (step S77). If the command is not completed, the flow returns to the main processing (step S76).

Next, referring to FIG. 18 the moving body information acquisition processing of step S73 is described. First, the line of sight instruction section 65 reads the moving object data 90 from the memory 8 (step S78). Based on the moving object data 90 which was read, it is then determined whether there is a moving body or not (step S79). If the result is that there is no moving body, the processing ends without doing anything, and the flow returns to the main processing. On the other hand, in the case where there is a moving object, the individual person ID is read from the memory 8 (step S80).

The line of sight instruction section 65 reads the face position coordinates 117 from the person information map which matches the person ID, obtains an estimated position of the head section, and then from this estimated position, obtains the pan angle and tilt angle of the cameras 1L and 1R (step S81). The line of sight instruction section sends the obtained pan angle and the tilt angle to the action control section 9 (step S82). As a result, the cameras 1L and 1R, that is to say the head section R2 of the autonomous robot come to face in the direction of the head of the person. Therefore, because the cameras 1L and 1R always come to face the direction of the head of the person who issues the instruction "come", it becomes possible to track the person.

Figure 19:
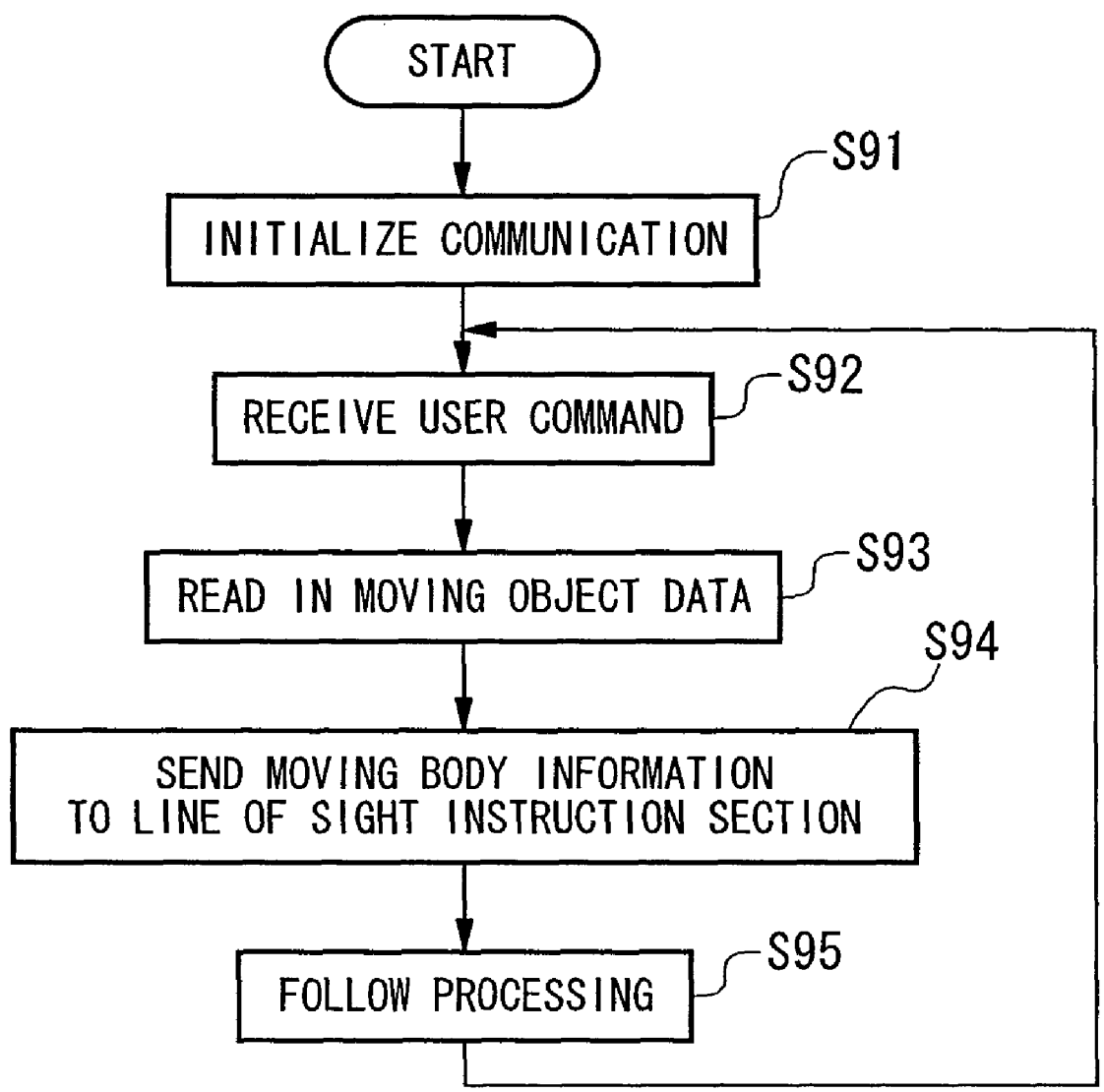
Figure 20:
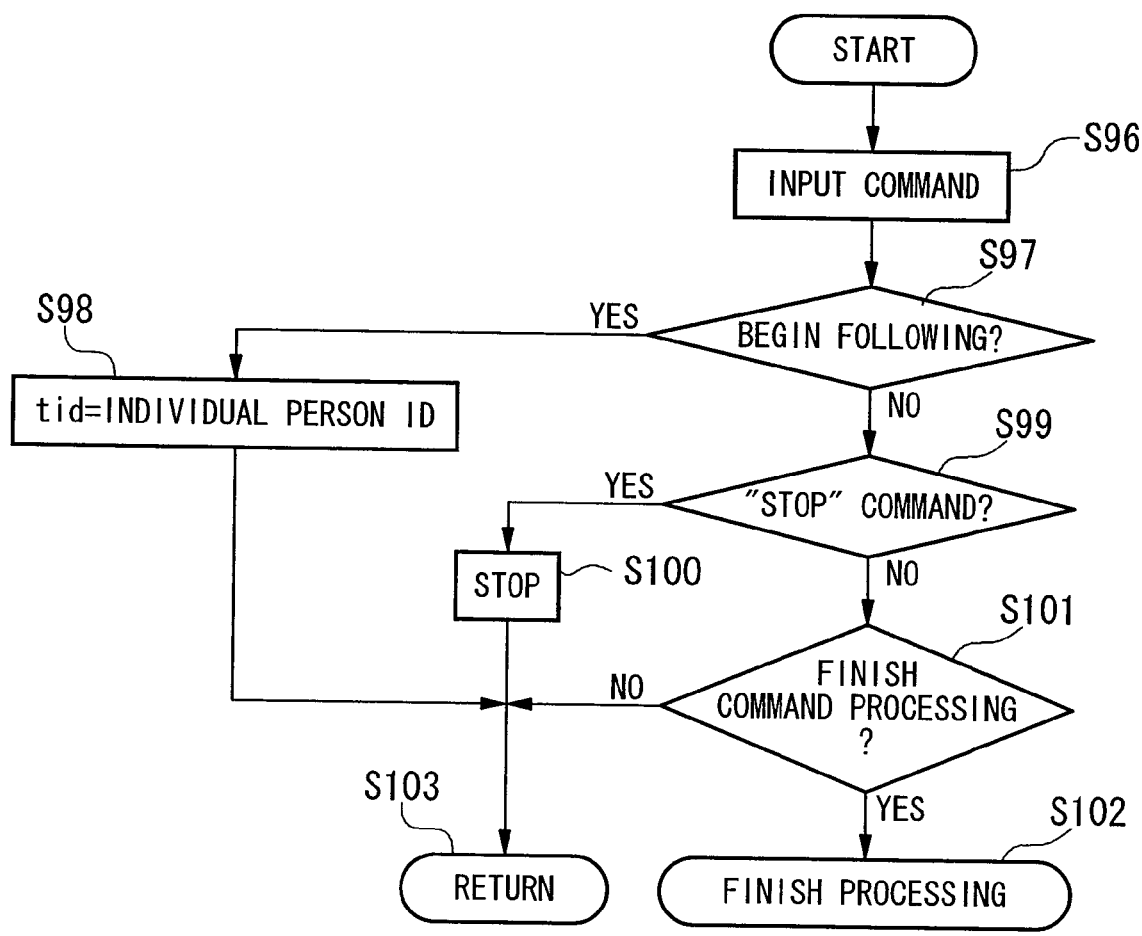
Figure 21:
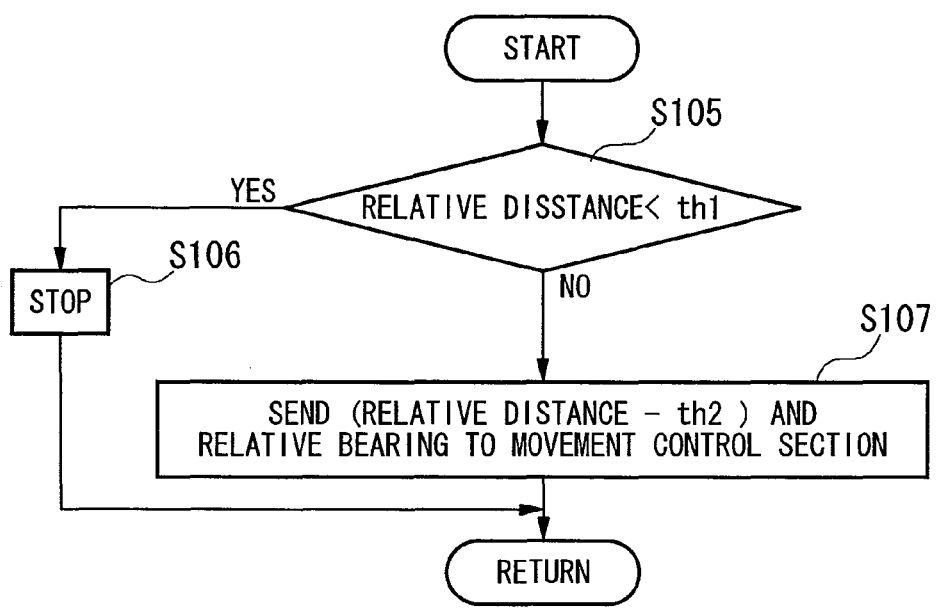

Next, referring to FIG. 19, FIG. 20 and FIG. 21, the operation of the movement instruction section 64 is described. To begin, referring to FIG. 19, the main process of movement instruction section 64 is described. First the movement instruction section 64 initializes communication between the other processing sections (step S91). Then, the movement instruction section 64 receives a command output from the response processing section 63 (step S92). Then, the movement instruction section 64 reads the moving object data 90 (step S93). This moving object data 90 is sent to the line of sight instruction section 65 (step S94). The movement instruction section 64, based on the moving object data 90, tracks the person who instructed "come" (step S95). The movement instruction section 64 executes the processing of step S92 through S95 repeatedly.

Next, referring to FIG. 20, the command receiving processing shown in FIG. 19 (step S92) is described. First the movement instruction section 64 inputs the command output from the response processing section 63 (step S96). It is determined whether or not it is a user command to begin following (step S97). If this result is a command to begin following, the individual person ID 114 is set to a variable and the flow returns to the main processing (step S103). In step S97, in the case where it is not a begin following command, the movement instruction section 64 determines whether or not it is a stop command (step S99). In the case where this result is a stop command, the movement instruction section 64 outputs a stop command to the action control section 9 (step S100), and the flow returns to the main processing (step S103). As a result, the autonomous robot R stops movement. In step S99, in the case where it is not a stop command, the movement instruction section 64 determines whether or not command processing is finished (step S101). If the command processing is not finished, the flow returns to the main processing (step S103), and if the command processing is finished, the processing ends (step S102).

Next, referring to FIG. 21, the follow processing (step S95) shown in FIG. 19 is described. First the movement instruction section 64 determines whether or not the obtained object distance is shorter than a predetermined value th1 (here, 90 cm) (step S105). In the case where this result is shorter than the predetermined value th1 the movement instruction section 64 outputs a stop instruction to the action control section 9 (step S106), and the flow returns to the main processing. As a result, the autonomous robot R has come too close to the person it is following so it stops. Conversely, in the case where the object distance is greater than the predetermined value th1, the movement instruction section 64 sends a value of a predetermined value th2 subtracted from the object distance, and a relative bearing, to the action control section 9 (step S107) and the flow returns to the main processing. As a result, the operation for following a person is set up.

Figure 22:
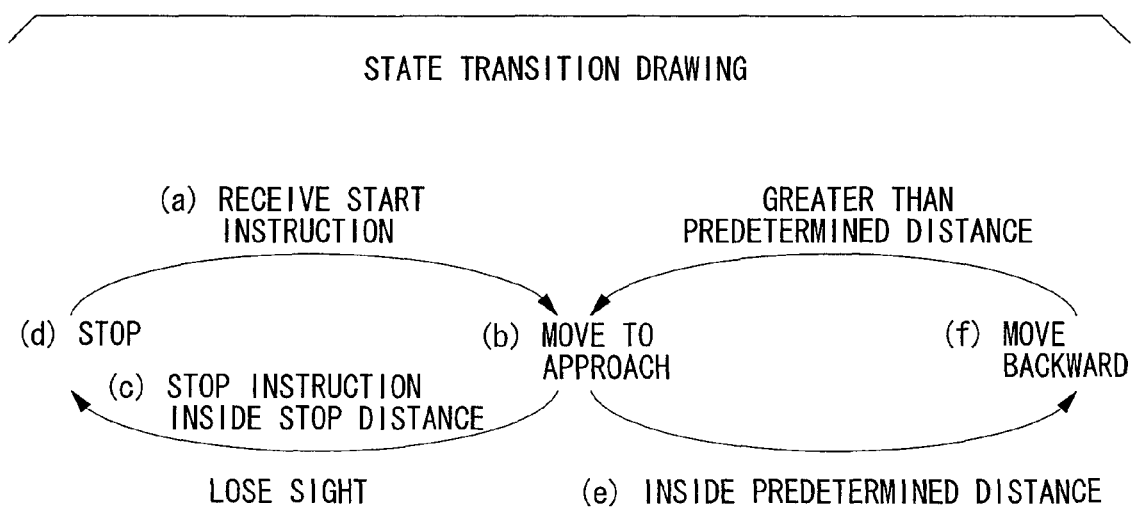
FIG. 22 is an explanatory drawing showing the state transition of the processing section 5 shown in FIG. 1.

Next, referring to FIG. 22, the state transition in the case where the follow operation is being performed is described. First, the instruction to begin following is received (a), and the robot moves to approach the person who issued the command (b). In the case where a stop instruction is received, if the robot is inside the stop distance, and if sight of the person is lost (c), it stops (d). Conversely, in the case where the robot moves to approach and comes too close (within a predetermined distance) (e), it moves backward (f). In the case where the result of moving backward is that the distance has become greater than the predetermined distance it moves to approach (b). By carrying out this process repeatedly, the follow operation towards a person is realized.

In this way, in the case where the instruction is issued by posture from the person who issues the instruction, the processing of the action operation corresponding to this operation is executed. Therefore, it becomes possible to control the operation of the autonomous robot R without using an external controller or the like.

By recording a program to realize the functions of each of the processing sections in FIG. 1, onto a computer readable recording medium, and reading and executing the program recorded onto this recording medium by a computer system, posture recognition processing and response processing can be carried out. The "computer system" mentioned here is taken as including an OS and hardware such as peripheral equipment. In the case where the "computer system" makes use of the WWW system, then this also includes a homepage providing environment (or display environment). The "computer readable recording medium" refers to portable data media such as flexible disks, magneto-optical disks, ROM, and CD-ROM, and storage devices such as hard disks built into the computer system. Moreover, the "computer readable recording medium" also includes media which holds a program for a predetermined time, such as the internal volatile memory (RAM) in a server or client computer system for the case when a program is sent via a communication line such as a network like the internet or a telephone line or the like.

The above program can be transmitted from a computer system with this program stored in its storage device, to another computer system via a transmission medium, or by transmission waves within the transmission medium. The "transmission medium" which transmits the program refers to a medium with the function of transmitting information such as with a network like the internet (communication web) or a communication line such as a telephone line (communication line). The above program may be one for realizing one part of the aforementioned functions. Furthermore, it may also be a so-called differential file (differential program) which can realize the aforementioned functions by combination with a program already stored in the computer system.

What is claimed is:

1. A posture recognition apparatus that recognizes instructions signified by postures of persons present in the surroundings, from images obtained with an image capture device, the posture recognition apparatus comprising:
   an outline extraction device that extracts an outline of a body which is a candidate for a person from the images;
   a distance calculation device that calculates a distance to the body being the candidate, from distance information of each pixel within the outline in the image;
   a search device that searches for a candidate for a hand of a person based on the outline and the distance to the body represented by the outline; and
   a posture determination device that determines an instruction corresponding to the relative position of the candidate for a hand and the outline, and outputs this determination result as a posture determination result.

2. A posture recognition apparatus according to claim 1, further comprising a setting file in which an instruction is defined for each relative position of a hand to a body or a face of a person,
   and the posture determination device obtains a posture determination result by referring to the instructions defined in the setting file.

3. A posture recognition apparatus according to claim 2, wherein a priority level is defined for each instruction in the setting file.

4. A posture recognition apparatus according to claim 1, further comprising a color area extraction device which extracts color information from the image and extracts areas having a predetermined color, and
   the search device makes an area inside the outline having a predetermined color a candidate for a hand of a person.

5. A posture recognition apparatus according to claim 1, further comprising a device which, in the case where a plurality of persons are present in the surroundings, recognizes from the image the posture of each person based on the output of the outline extraction device.

6. A posture recognition apparatus according to claim 5, wherein in the case where a plurality of persons are present in the surroundings, the instruction of the person closest to the center of the image is prioritized.

7. A posture recognition apparatus that recognizes instructions signified by postures of persons present in the surroundings, from images obtained with an image capture device, the posture recognition apparatus comprising:
   an outline extraction device that extracts an outline of a body which is a candidate for a person from the images;
   a distance calculation device that calculates a distance to the body being the candidate, from distance information of each pixel within the outline in the image;
   a search device that searches for a candidate for a hand of a person based on the outline and the distance to the body represented by the outline;
   a posture determination device that determines an instruction corresponding to the relative position of the candidate for a hand and the outline, and outputs this determination result as a posture determination result; and a device which, in the case where a plurality of persons are present in the surroundings, recognizes from the image the posture of each person based on the output of the outline extraction device, wherein in the case where a plurality of persons are present in the surroundings, the instruction of the person closest to the center of the image is prioritized; and wherein in the case where the instruction issued by a person not closest to the center of the image is a predetermined instruction, the instruction of the person who issues this predetermined instruction is prioritized based on at least the priority level defined for the setting file.

8. A posture recognition apparatus according to claim 5, further comprising a face recognition device that recognizes faces from amongst a plurality of persons, and the instruction of a particular person is prioritized, based on this face recognition result.

9. A posture recognition apparatus according to claim 1, further comprising;
a vertex point extraction device that extracts a vertex point from the outline and,
a device that determines the position of a face and hand based on the vertex point.

10. An autonomous robot comprising a posture recognition apparatus according to claim 1, further comprising:
a recognition result obtaining device that obtains a posture recognition result from the posture recognition apparatus;
a movement instruction device that outputs movement instructions for performing self movement control in order that movements corresponding to the posture recognition result are initiated and,
a movement control device that performs self movement control based on the movement instructions.

11. An autonomous robot according to claim 10, further comprising an image capture instruction device that outputs image capture instructions for performing self control of directing its own image capture device toward a person so that movements corresponding to the posture recognition result can be initiated, and the movement control device performs self movement control based on the image capture instructions.

12. An autonomous robot according to claim 11, wherein the movement control device, when steadily maintaining a distance to a person while moving, controls movement so as to move while maintaining a first predetermined distance.

13. An autonomous robot provided with a posture recognition apparatus that recognizes instructions signified by postures of persons present in the surroundings, from images obtained with an image capture device, the autonomous robot comprising:
an outline extraction device that extracts an outline of a body which is a candidate for a person from the images;
a distance calculation device that calculates a distance to the body being the candidate, from distance information of each pixel within the outline in the image;
a search device that searches for a candidate for a hand of a person based on the outline and the distance to the body represented by the outline;
a posture determination device that determines an instruction corresponding to the relative position of the candidate for a hand and the outline, and outputs this determination result as a posture determination result;
a recognition result obtaining device that obtains a posture recognition result from the posture recognition apparatus;
a movement instruction device that outputs movement instructions for performing self movement control in order that movements corresponding to the posture recognition result are initiated;
a movement control device that performs self movement control based on the movement instructions; and
an image capture instruction device that outputs image capture instructions for performing self control of directing its own image capture device toward a person so that movements corresponding to the posture recognition result can be initiated,
wherein the movement control device performs self movement control based on the image capture instructions;
wherein the movement control device, when steadily maintaining a distance to a person while moving, controls movement so as to move while maintaining a first predetermined distance; and
wherein the movement control device controls movement so as to stop, in the case where a distance to a person becomes at least less than a second predetermined distance which is shorter than the first predetermined distance.

14. An autonomous robot according to claim 13, wherein the movement control device controls movement so as to adjust a self movement speed so that a distance to a person is at least greater than the second predetermined distance, in the case where the distance to the person is greater than the second predetermined distance and less than the first predetermined distance.

15. An autonomous robot according to claim 11, wherein the movement control device controls movement so as to stop in the case where instructions are not recognized in a predetermined time period, and controls movement so as to standby until new recognition is possible.

16. A posture recognition apparatus according to claim 1, wherein the outline extraction device employs the Snake Technique to extract an outline of the body which is the candidate for a person.

* * * * *